(12) United States Patent
Costa et al.

(10) Patent No.: US 10,764,172 B1
(45) Date of Patent: Sep. 1, 2020

(54) WIRELESS COMMUNICATION NETWORK WITH WIRELESS RELAYS THAT SERVE DATA CONTENT TO WIRELESS USER DEVICES

(71) Applicant: Sprint Communications Company L.P., Overland Park, KS (US)

(72) Inventors: Julio C. Costa, Tampa, FL (US); Lawrence Charles Gassman, Oakton, VA (US); Muralidhar Reddy Malreddy, Overland Park, KS (US); Bhanu Prakash Voruganti, Overland Park, KS (US); Kyle C. Allen, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 16 days.

(21) Appl. No.: 16/237,033

(22) Filed: Dec. 31, 2018

(51) Int. Cl.
*H04B 7/00* (2006.01)
*H04L 12/733* (2013.01)
*H04W 12/00* (2009.01)
*H04W 80/02* (2009.01)
*H04W 76/27* (2018.01)
*H04W 8/08* (2009.01)

(52) U.S. Cl.
CPC .............. *H04L 45/20* (2013.01); *H04W 8/08* (2013.01); *H04W 12/0017* (2019.01); *H04W 76/27* (2018.02); *H04W 80/02* (2013.01)

(58) Field of Classification Search
CPC . H04W 40/02; H04W 40/023; H04W 40/026; H04W 40/04; H04W 72/12
USPC .................. 370/310, 315, 328, 338
See application file for complete search history.

(56) References Cited

U.S. PATENT DOCUMENTS

| | | | |
|---|---|---|---|
| 7,366,149 B2 | 4/2008 | Maki et al. | |
| 7,499,462 B2 | 3/2009 | MacMullan et al. | |
| 7,992,175 B2 | 8/2011 | Kahn et al. | |
| 8,031,684 B2 * | 10/2011 | Roadknight | H04W 8/18 370/338 |

(Continued)

FOREIGN PATENT DOCUMENTS

| | | |
|---|---|---|
| CN | 106550039 B | 3/2017 |
| EP | 2918112 B1 | 8/2018 |

(Continued)

OTHER PUBLICATIONS

Das, Mitigating the Gateway Bottleneck, Purdue, pp. 1-44, 2006.*

*Primary Examiner* — Dmitry Levitan

(57) ABSTRACT

A wireless communication network serves data content to a wireless user device. An access wireless relay wirelessly receives a user request for the data content from the wireless user device. The access wireless relay wirelessly transfers the data content to the wireless user device when it stores the data content. When the access wireless relay does not store the data content, it transfers content requests having a Time-To-Live (TTL). Serving wireless relays receive the content requests during the TTL. The serving wireless relays transfer the data content to the access wireless relay if they store the data content. The serving wireless relays forward the content requests with the TTL when they do not store the data content. Terminating wireless relays receive the content requests after the TTL. The terminating wireless relays stop forwarding the content requests.

20 Claims, 5 Drawing Sheets

(56) References Cited

U.S. PATENT DOCUMENTS

| | | | |
|---|---|---|---|
| 8,478,244 B2* | 7/2013 | Choi | H04L 63/02 |
| | | | 455/414.1 |
| 9,071,653 B2* | 6/2015 | Hao | H04W 4/029 |
| 9,384,334 B2* | 7/2016 | Burba | G06F 21/105 |
| 10,136,250 B2* | 11/2018 | Krzych | H04B 17/318 |
| 10,257,077 B1* | 4/2019 | Zhu | H04L 12/1877 |
| 10,291,474 B2* | 5/2019 | Shailendra | H04L 67/1097 |
| 10,440,631 B1* | 10/2019 | Joshi | H04L 45/306 |
| 10,484,925 B1* | 11/2019 | Chen | H04W 40/16 |
| 10,588,069 B1* | 3/2020 | Chen | H04L 45/123 |
| 2003/0115293 A1 | 6/2003 | Fogg et al. | |
| 2007/0124789 A1 | 5/2007 | Sachson et al. | |
| 2010/0124233 A1* | 5/2010 | Shi | H04L 45/00 |
| | | | 370/401 |
| 2010/0202346 A1* | 8/2010 | Sitzes | H04W 12/1201 |
| | | | 370/328 |
| 2012/0005304 A1* | 1/2012 | Guo | H04L 12/1836 |
| | | | 709/217 |
| 2014/0222560 A1* | 8/2014 | Kota | G06Q 30/0255 |
| | | | 705/14.53 |

FOREIGN PATENT DOCUMENTS

| | | |
|---|---|---|
| WO | 2002009363 A2 | 1/2002 |
| WO | 2007118350 A1 | 10/2007 |

* cited by examiner

WIRELESS COMMUNICATION NETWORK WITH WIRELESS RELAYS THAT SERVE DATA CONTENT TO WIRELESS USER DEVICES

TECHNICAL BACKGROUND

Wireless communication networks serve wireless user devices with mobile data services like media streaming and software downloading. The wireless data networks have wireless access points that exchange user data over the air with the wireless user devices. To extend the range of the mobile data services, the wireless communication networks deploy wireless relays between the wireless user devices and the wireless access points.

A wireless relay has an internal access point and an internal user device. The internal access point in the relay serves the wireless user devices. The wireless communication network serves internal user device in the relay, and the internal user device serves the internal access point. The communication network is able to serve wireless user devices over the user device and access point in the wireless relay. In some wireless communication networks, several wireless relays are coupled in a grid fashion to cover a geographic area like a factory, school, or office. In some wireless communication networks, several wireless relays are coupled in a line or tree to cover a roads, railways, and the like. The wireless relays often form a relay network between the wireless user devices and the wireless communication network.

Unfortunately, the wireless relays have not been optimized to support the mobile data services like media streaming and software downloading. Although the wireless relays provide wireless connectivity between the wireless user devices and the wireless communication network, the wireless relays do not efficiently and intelligently support media streaming and software downloading between the wireless user devices and the wireless communication network.

TECHNICAL OVERVIEW

A wireless communication network serves data content to a wireless user device. An access wireless relay wirelessly receives a user request for the data content from the wireless user device. The access wireless relay wirelessly transfers the data content to the wireless user device when it stores the data content. When the access wireless relay does not store the data content, it transfers content requests having a Time-To-Live (TTL). Serving wireless relays receive the content requests during the TTL. The serving wireless relays transfer the data content to the access wireless relay if they store the data content. The serving wireless relays forward the content requests with the TTL when they do not store the data content. Terminating wireless relays receive the content requests after the TTL. The terminating wireless relays stop forwarding the content requests. Advantageously, the wireless relays efficiently and intelligently support media streaming and software downloading between the wireless user devices and the wireless communication network.

DETAILED DESCRIPTION

Figure 1:
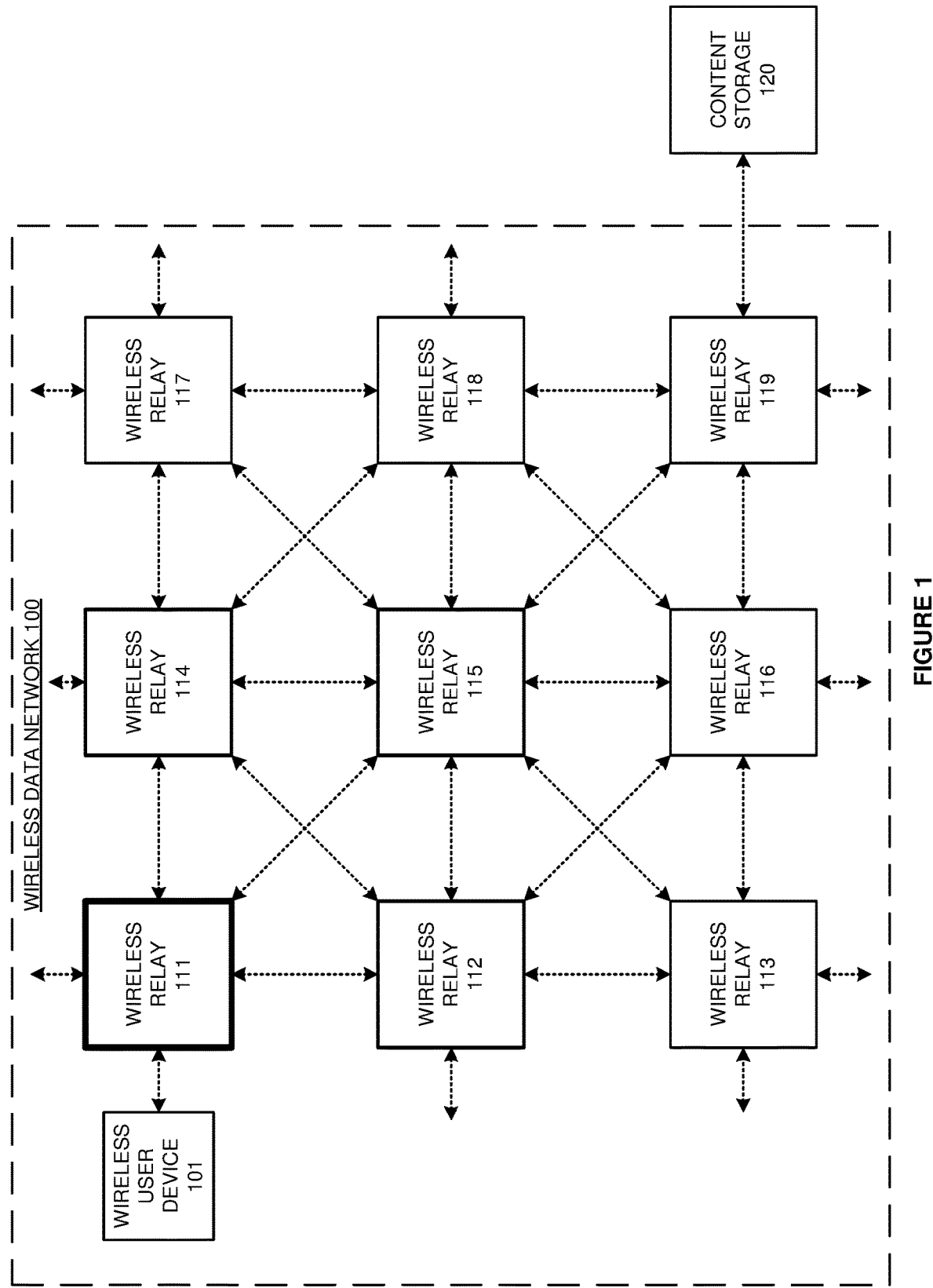
FIG. 1 illustrates a wireless communication network with wireless relays that serve data content to wireless user devices.

FIG. 1 illustrates wireless communication network 100 with wireless relays 111-119 that serve data content to wireless user device 101. The number of wireless user devices and wireless relays in wireless communication network 100 is typically far higher, but the amount shown has been restricted for clarity. The data content could be video, software, files, or some other type of digital information. Wireless relays 111-119 are coupled together in a grid configuration, although other network architectures could be used (mesh, lines, trees, hub/spoke, and the like). Wireless relays 111-119 are coupled together by wireless and/or wireline links. Wireless relay 119 is coupled to content storage 120 over one or more data communication networks.

Wireless user device 101 is wirelessly attached to wireless relay 111, so wireless relay 111 is referred to as an "access" wireless relay. Access wireless relay 111 transfers content requests having a Time-To-Live (TTL). The wireless relays that serve data content responsive to the content requests or that forward the content requests are referred to as "serving" wireless relays. The wireless relays that stop the propagation of the content requests when the TTL expires are referred to as "terminating" wireless relays. Wireless relays 111-119 each operate as an access, serving, or terminating relay depending on the location of the wireless user devices.

Wireless user device 101 might be a computer, phone, headset, graphic display, sensor, or some other wireless communication apparatus. Wireless user device 101 comprises wireless transceiver circuitry and baseband circuitry. The wireless transceiver circuitry comprises antennas, modulators, amplifiers, filters, digital/analog interfaces, Digital Signal Processors (DSPs), memory circuitry, firmware/software, and bus circuitry. The wireless transceiver circuitry uses wireless network protocols like Fifth Generation New Radio (5GNR), Long Term Evolution (LTE), and Institute of Electrical and Electronic Engineers 802.11 (WIFI).

The baseband circuitry comprises processing circuitry, memory circuitry, software, and bus circuitry. The processing circuitry comprises Central Processing Units (CPUs), Graphics Processing Units (GPUs), Application Specific Integrated Circuits (ASICs), and/or the like. The memory circuitry comprises volatile and non-volatile data storage like Random Access Memory (RAM), cache memory, flash drives, disk drives and/or the like. The memory circuitry stores an operating system, user application, content application, Physical Layer (PHY), Media Access Control (MAC), Radio Link Control (RLC), Packet Data Convergence Protocol (PDCP), Radio Resource Control (RRC), Service Data Application Protocol (SDAP), and/or the like.

Wireless relays 111-119 each comprise wireless transceiver circuitry and baseband circuitry. The wireless transceiver circuitry comprises antennas, modulators, amplifiers, filters, digital/analog interfaces, DSPs, memory circuitry, firmware/software, and bus circuitry. The transceiver circuitry uses wireless network protocols like 5GNR, LTE, and WIFI. The baseband circuitry comprises processing circuitry, memory circuitry, software, bus circuitry, and network transceiver circuitry. The processing circuitry comprises CPUs, GPUs, ASICs, and/or the like. The memory circuitry comprises volatile and non-volatile data storage like RAM, cache memory, flash drives, disk drives and/or the like. The memory circuitry stores operating systems, relay applications, content applications, PHY, MAC, RLC, PDCP, RRC, SDAP, and/or the like.

Wireless relays 111-119 store various data content from content storage 120, wireless user device 101, or some other source. Wireless relays 111-119 exchange content information indicating their stored content and metadata. The metadata may indicate content popularity, user priority, and the like. Popular data content is usually stored in multiple wireless relays, and rare content might be stored in a single wireless relay or not at all. Priority data content for a specific user is often stored in a wireless relay that is proximate to that specific user.

Wireless user device 101 encrypts and transfers a user request for data content to wireless relay 111—the access wireless relay for wireless user device 101. The user request has a content identifier (ID) like a Uniform Resource Indicator (URI), multimedia name, software version, or serial number. Wireless relay 111 receives and decrypts the user request. If wireless relay 111 already stores the requested data content, then wireless relay 111 wirelessly transfers the data content to wireless user device 101. If wireless relay 111 does not store the data content, then wireless relay 111 encrypts and transfers content requests having the content ID and a TTL. An exemplary TTL may be 30 milliseconds, although other TTLs could be used.

In some examples, wireless relay 111 transfers the content requests to other wireless relays based on routing data that indicates which of adjacent wireless relays 112 and 114-115 should receive a content request from access wireless relay 111. In other examples, wireless relay 111 transfers the content requests based on content information that indicates which wireless relays 112-119 store the requested data content. In this illustrative example, wireless relay 111 transfers content requests to wireless relays 114-115.

Wireless relays 114-115 receive and decrypt the content requests from wireless relay 111 before the TTL expires. Thus, wireless relays 114-115 represent serving wireless relays. If wireless relay 114 stores the data content, then wireless relay 114 encrypts and transfers the data content to wireless relay 111, and wireless relay 111 wirelessly transfers the data content to wireless user device 101. If wireless relay 114 does not store the data content, then wireless relay 114 encrypts and forwards the content request having the content ID and TTL based on its routing data and/or content information.

If wireless relay 115 stores the data content, then wireless relay 115 encrypts and transfers the data content to wireless relay 111, and wireless relay 111 wirelessly transfers the data content to wireless user device 101. When access wireless relay 111 receives the data content from multiple serving wireless relays, wireless relay 111 selects the best data content service from a serving wireless relay and sends termination messages to the other serving wireless relays. The other serving wireless relays terminate their data content service to access wireless relay 111.

If wireless relay 115 does not store the data content, then wireless relay 115 encrypts and forwards the content request having the content ID and TTL based on its routing data and/or content information. In this illustrative example, wireless relay 114 encrypts and transfers content requests to wireless relays 117-118, and wireless relay 115 encrypts and transfers a content request to wireless relay 119.

Wireless relays 117-119 receive and decrypt the content requests from wireless relays 114-115 after the TTL expires. Thus, wireless relays 117-119 represent terminating wireless relays. After TTL expiration, wireless relays 117-119 do not transfer the requested data content. After TTL expiration, wireless relays 117-119 do not forward the content requests. The TTL effectively kills the content requests in terminating wireless relays 117-119. Wireless user device 101 or access wireless relay 111 may then retrieve the requested data content from content storage 120 or some other source.

In some examples, the user requests, the content requests, and the content information transport a popularity indicator for the data content. Wireless relays 111-119 may store data content they handle when the popularity indicator exceeds a popularity threshold. Wireless relays 111-119 may have different popularity thresholds. The user requests, the content requests, and the content information transport user priority indicators for the data content. Wireless relays 111-119 may store data content they handle when a user priority indicator exceeds a priority threshold for one of its attached or home users. Wireless relays 111-119 may have different priority thresholds. The user requests and the content requests may transport user mobility information like a geographic vector, earth coordinates, radio sector, and the like. Wireless relays 111-119 may store data content they handle when the user mobility information indicates that a user is consuming the data content and will soon attach.

Advantageously, wireless relays 111-119 efficiently and intelligently support media streaming and software downloading between wireless user device 101 and wireless communication networks.

Figure 2:
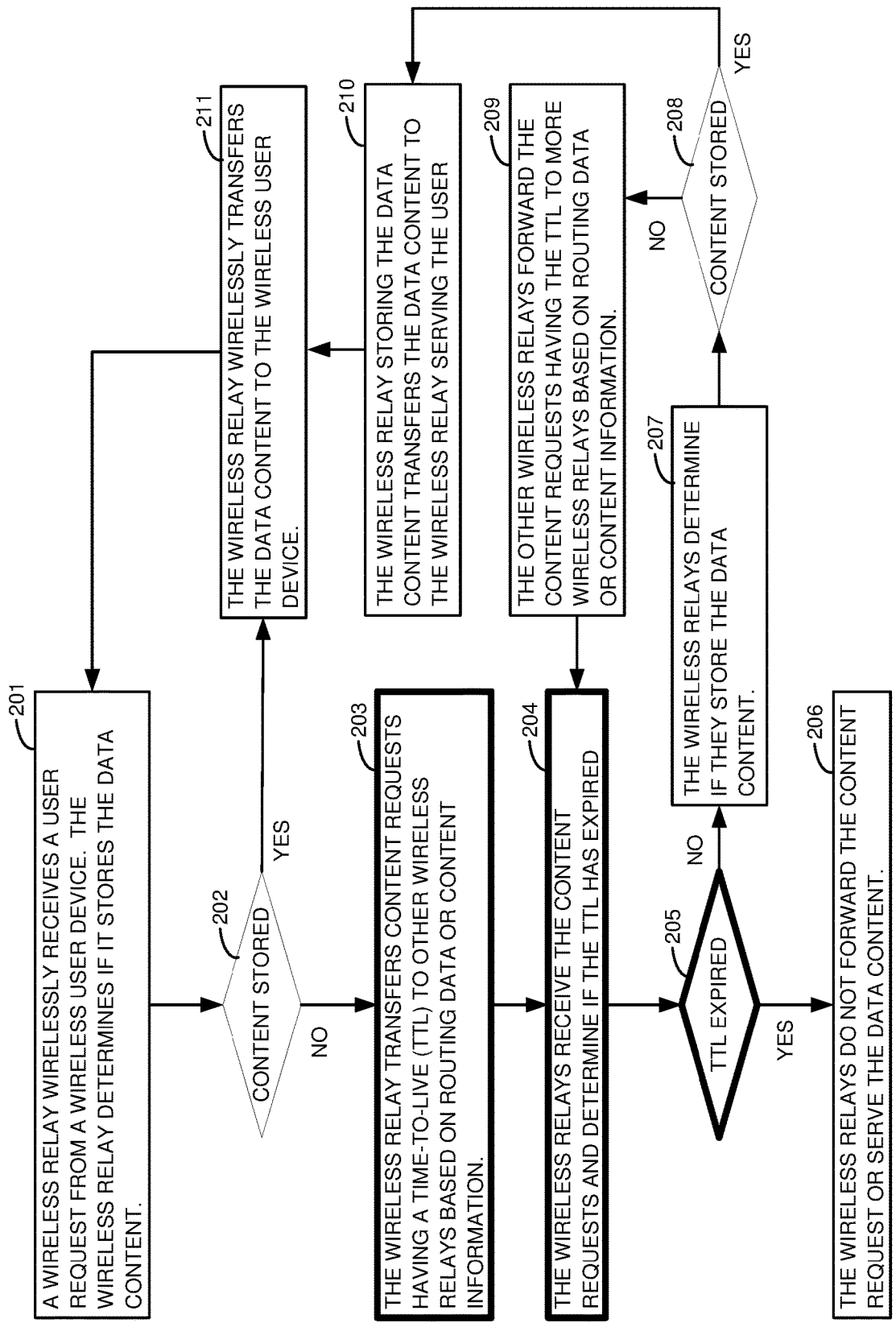
FIG. 2 illustrates wireless network operations to serve data content from wireless relays to wireless user devices.

FIG. 2 illustrates wireless network operations to serve data content from wireless relays to wireless user devices. An access wireless relay receives a user request for data content from a wireless user device (201). The user request includes a content ID, user priority, content popularity, and mobility information. The access wireless relay determines if it stores the requested data content. If the access wireless relay stores the requested data content (202), then the access wireless relay wirelessly transfers the data content to the wireless user device (211). If the access wireless relay does not store the requested data content (202), then the access wireless relay wirelessly transfers content requests to other wireless relays based on routing data and/or content information (203). The content requests have a Time-To-Live (TTL) along with the content ID, user priority, content popularity, and user mobility information. The other wireless relays receive the content requests and determine if the TTL has expired (204). If the TTL has expired (205), then the other wireless relays terminate the content requests by not forwarding the content requests and by not serving the data content (206).

If the TTL has not expired (205), then the other wireless relays determine if they store the requested data content (207). If one of the other wireless relays stores the requested data content (208), then that wireless relay serves the data content to the access wireless relay (210). The access wireless relay wirelessly transfers the data content to the wireless user device and transfers termination messages to the other serving wireless relays if necessary (211). The other serving wireless relays terminate their data content service to the access wireless relay responsive to the termination messages.

If the other wireless relays do not store the requested data content (208), then the other wireless relays transfer content requests to additional wireless relays based on routing data and/or content information (209). The content requests have the TTL along with the content ID, user priority, content popularity, and mobility information. The additional wireless relays receive the content requests and determine if the TTL has expired (204). The above process repeats until TTL expiry (205).

Figure 3:
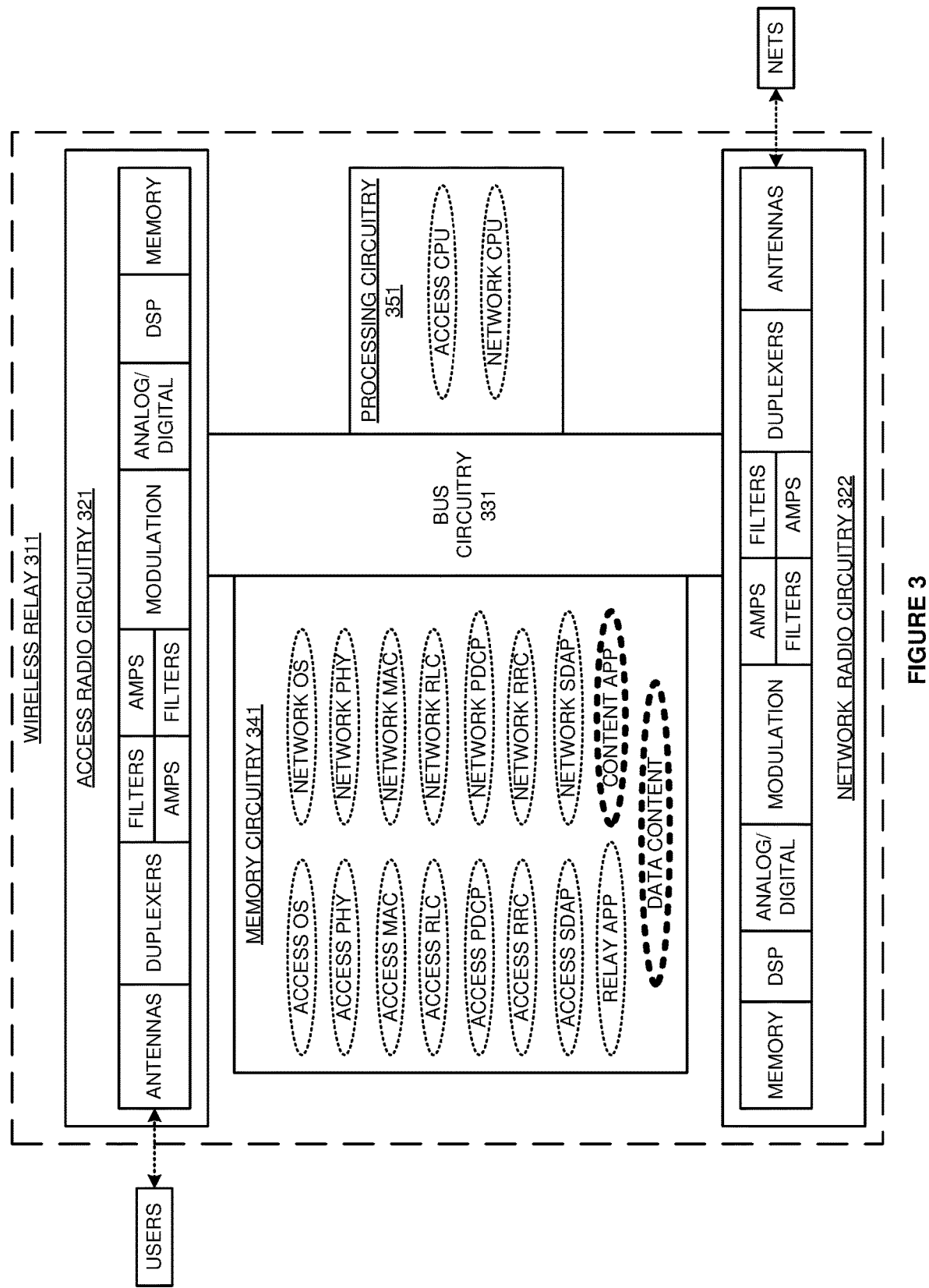
FIG. 3 illustrates a wireless relay that serves data content to wireless user devices.

FIG. 3 illustrates wireless relay 311 that serves data content to wireless user devices. The hardware/software architecture of wireless relay 311 is exemplary and other architectures could be used. Wireless relay 311 comprises radio circuitry 321-322, bus circuitry 331, memory circuitry 341, processing circuitry 351. Bus circuitry 331 couples radio circuitry 321-322, memory circuitry 341, and processing circuitry 351. Memory circuitry 331 stores operating systems, PHY, MAC, RLC, PDCP, RRC, and SDAP for both user access and network communications. Memory circuitry 331 stores a relay application, content application, and data content. Radio circuitry 321-322 comprise antennas, duplexers, filters, amplifiers, modulators, analog/digital interfaces, DSPs/CPUs, memory.

In access radio circuitry 321, the antennas receive wireless Uplink (UL) signals from the wireless user devices or wireless relays and transfer corresponding electrical UL signals through the duplexers to the amplifiers. The amplifiers boost the UL signals for filters which attenuate unwanted energy. In modulation, demodulators down-convert the UL signals from their carrier frequencies. The analog/digital interfaces convert the analog UL signals into digital UL signals for the DSPs. The DSPs recover UL data and signaling from the UL signals and transfer the recovered UL data and signaling to memory circuitry 341. Various applications process the UL data and signaling in memory circuitry 341. The relay application aggregates UL data and signaling from the access RRC/SDAP as "relay data" for the network RRC/SDAP.

In network radio circuitry 322, the memory circuitry receives the processed UL data and signaling from memory circuitry 341. The DSP transfers corresponding UL signals to the analog/digital interface. The analog/digital interface converts the digital UL signals into analog UL signals for the modulators. The modulators up-convert the UL signals to their carrier frequencies. The amplifiers boost the UL signals for the filters which attenuate unwanted out-of-band energy. The filters transfer the UL signals through the duplexers to the antennas. The electrical UL signals drive the antennas to emit corresponding wireless UL signals to the wireless networks.

In network radio circuitry 322, the antennas receive wireless Downlink (DL) signals from the wireless networks and transfer corresponding electrical DL signals through the duplexers to the amplifiers. The amplifiers boost the DL signals for filters which attenuate unwanted energy. In modulation, demodulators down-convert the DL signals from their carrier frequencies. The analog/digital interfaces convert the analog DL signals into digital DL signals for the DSPs. The DSPs recover DL data and signaling from the DL signals and transfer the recovered DL data and signaling to memory circuitry 341. Various applications process the DL data and signaling in memory circuitry 341. The relay application distributes DL "relay data" from the network RRC/SDAP as user data and signaling for the access RRC/SDAP.

In access radio circuitry 321, the memory circuitry receives the processed DL data and signaling from memory circuitry 341. The DSP in radio circuitry 321 transfers corresponding DL signals to the analog/digital interface. The analog/digital interface converts the digital DL signals into analog DL signals for the modulators. The modulators up-convert the DL signals to their carrier frequencies. The amplifiers boost the DL signals for the filters which attenuate unwanted out-of-band energy. The filters transfer the DL signals through the duplexers to the antennas. The electrical DL signals drive the antennas to emit corresponding wireless DL signals to the wireless user devices.

The DSP in radio circuitry 321 executes firmware/software to drive the exchange of data between the antennas and the radio circuitry memories. The access CPU in processing circuitry 351 executes the access operating system and access applications to drive the exchange of data between these radio circuitry memories and the memory circuitry 341. The access CPU and/or the network CPU in processing circuitry 351 execute the relay application to drive the exchange of data between the access RRC/SDAP and the network RRC/SDAP.

The network CPU in processing circuitry 351 executes the network operating system and network applications to drive the exchange of data between memory circuitry 341 and the radio circuitry memories in network radio circuitry 322. The DSP in radio circuitry 323 executes firmware/software to drive the exchange of data between the radio circuitry memories and the antennas. In radio circuitry 322, the antennas exchange wireless data with wireless data networks or other wireless relays.

The access PHY performs functions for wireless communications with the wireless user devices or relays, and the network PHY performs functions for wireless communications with the wireless data networks or relays. The PHY functions comprise: packet formation/deformation, windowing/de-windowing, guard-insertion/guard-deletion, and Fast Fourier Transforms (FFTs)/Inverse FFTs (IFFTs), data mapping/de-mapping, interleaving/de-interleaving, parsing/de-parsing, Forward Error Correction (FEC) encoding/decoding, control insertion/removal, Resource Element (RE) mapping/de-mapping, precoding, layer mapping/de-mapping, modulation mapping/de-mapping, channel estimation, channel equalization, and Inverse Discrete Fourier Transforms (IDFT), scrambling/descrambling, FEC encoding/decoding, parsing/de-parsing, interleaving/de-interleaving, data mapping/de-mapping, channel coding/decoding, rate matching/de-matching, modulation mapping/de-mapping, layer mapping/de-mapping, IDFT, channel estimation, channel equalization, precoding, and RE mapping/de-mapping.

The access MAC performs functions for wireless communications with the wireless user devices or relays, and the network MAC performs functions for wireless communications with the wireless data networks or relays. The MAC maps between the MAC transport channels and MAC logical channels. MAC functions include buffer status, power headroom, channel quality, Hybrid Automatic Repeat Request (HARQ), user identification, random access, scheduling, and Quality-of-Service (QoS).

The access RLC performs functions for wireless communications with the wireless user devices or relays. The network RLC performs functions for wireless communications with the wireless data networks or relays. The RLCs map between the MAC logical channels and Protocol Data Units (PDUs). RLC functions comprise ARQ, sequence numbering and resequencing, segmentation and resegmentation. The RLCs exchange data and signaling with the PDCPs.

The access PDCP performs functions for wireless communications with the wireless user devices or relays. The network PDCP performs functions for wireless communications with the wireless data networks or relays. The PDCPs map between the PDUs from the RLCs and Service Data Units (SDUs) for the RRCs/SDAPs. The PDCP functions comprise security ciphering, header compression and decompression, sequence numbering and re-sequencing, de-duplication. The RRCs exchange SDUs with the PDCPs.

The access RRC performs functions for wireless communications with the wireless user devices or relays. The network RRC performs functions for wireless communications with the wireless data networks or relays. The RRCs handle security and key management, handover operations, status reporting, and QoS. The RRCs interact with wireless network controllers like Mobility Management Entities (MMEs) and/or Access Management Functions (AMFs) to establish and terminate data sessions. The access RRC supports N1 and Non-Access Stratum (NAS) messaging between the MMEs/AMFs and the wireless user devices. The network RRC supports N1 and Non-Access Stratum (NAS) exchanges messaging between the MMEs/AMFs and the relay application. The RRCs exchange user data SDUs with the PDCPs and exchange S1-U user data with network gateways. The access RRC directs the broadcast of system information to the wireless user devices. The access RRC pages the wireless user devices.

The access SDAP performs functions for wireless communications with the wireless user devices or relays. The network SDAP performs functions for wireless communications with the wireless data networks or relays. The SDAPs exchange SDUs with the PDCPs. The SDAPs exchange S3 data with User Plane Functions (UPFs) under the control of Session Management Functions (SMFs). The SDAPs map between the SDUs and the QoS flows and mark the QoS flows with the proper QoS.

The access CPU and or the network CPU in processing circuitry 351 execute the content application to process user requests for data content that indicate: content ID, user ID, user content priority, user geographic data, and content popularity. The content application generates content requests for the data content that indicate: TTL, content ID, user ID, user content priority, user geographic data, and content popularity. The content application encrypts and decrypts the content requests. The content application checks the TTLs. The content application serves the content data for good TTLs and transfers termination messages. The content application forwards the content requests for good TTLs. The content application terminates the content requests and does not serve content data for expired TTLs.

Advantageously, wireless relay 341 efficiently and intelligently support media streaming and software downloading between the wireless user devices and the wireless communication network.

Figure 4:
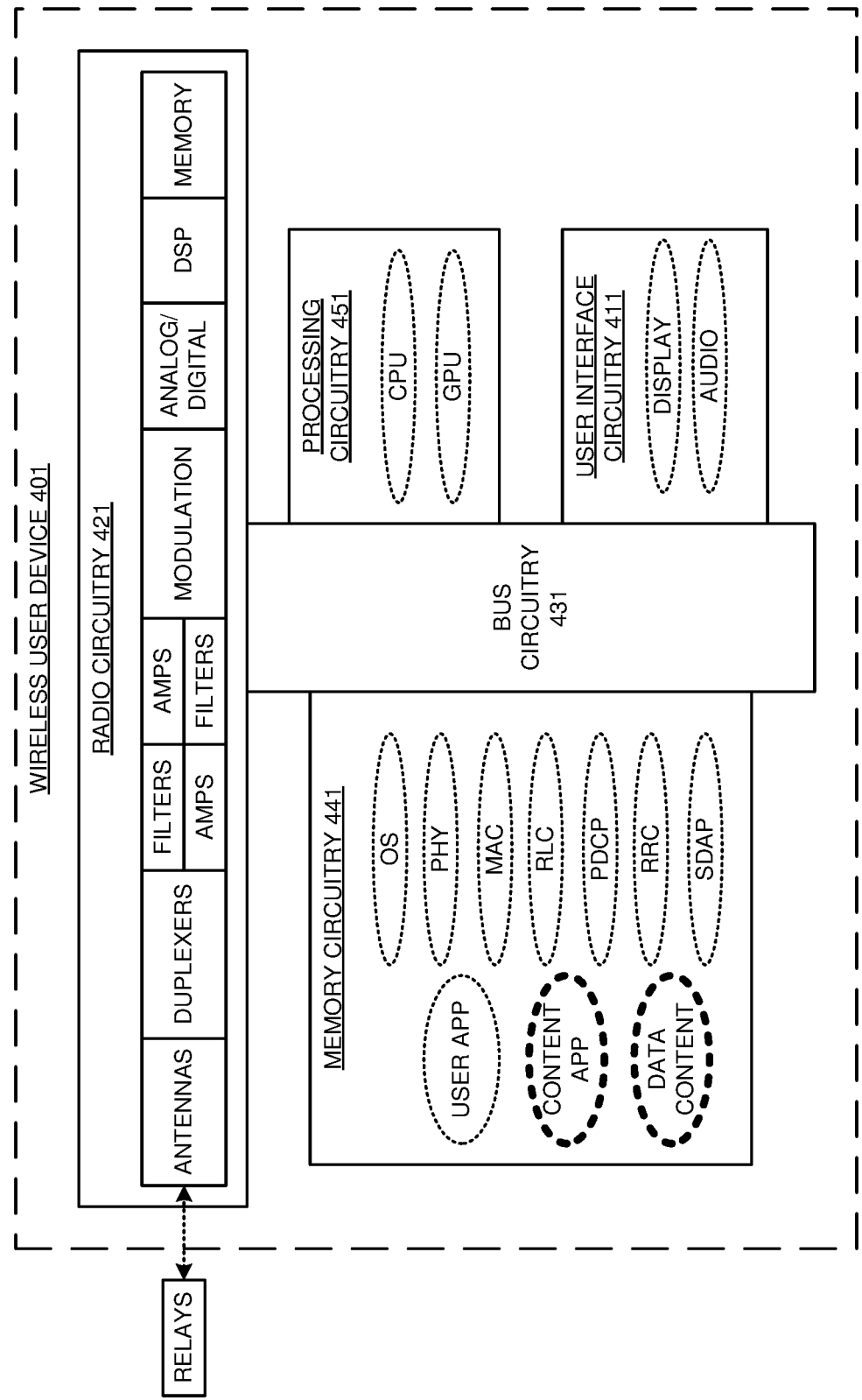
FIG. 4 illustrates a wireless user device that retrieves data content from wireless relays.

FIG. 4 illustrates wireless user device 401 that retrieves data content from wireless relays. The hardware/software architecture of wireless user device 401 is exemplary and other architectures could be used. Wireless user device 401 comprises user interface circuitry 411, radio circuitry 421, bus circuitry 431, memory circuitry 441, and processing circuitry 451. Bus circuitry 431 couples user interface circuitry 411, radio circuitry 421, memory circuitry 441, and processing circuitry 451. Memory circuitry 431 stores an operating system, PHY, MAC, RLC, PDCP, RRC, and SDAP. Memory circuitry 331 stores a user application, content application, and data content.

Radio circuitry 421 comprises antennas, duplexers, filters, amplifiers, modulators, analog/digital interfaces, DSPs/CPUs, memory. In radio circuitry 421, the antennas exchange wireless data with wireless relays. The DSP in radio circuitry 421 executes firmware/software to drive the exchange of data between the antennas and the radio circuitry memories. The access CPU in processing circuitry 451 executes the operating system and applications to drive the exchange of data between these radio circuitry memories and memory circuitry 441. The processing circuitry 451 CPU executes the operating system, user application, and content application. The content application retrieves and stores data content in memory circuitry 441. The user application consumes the retrieved data content in memory circuitry 441.

In radio circuitry 421, the antennas receive wireless DL signals from the wireless relays and transfer corresponding electrical DL signals through the duplexers to the amplifiers. The amplifiers boost the DL signals for filters which attenuate unwanted energy. In modulation, demodulators down-convert the DL signals from their carrier frequencies. The analog/digital interfaces convert the analog DL signals into digital DL signals for the DSPs. The DSPs recover DL data and signaling from the DL signals and transfer the recovered DL data and signaling to the radio memory for transfer to memory circuitry 441. Various applications process the DL data and signaling in memory circuitry 441.

In radio circuitry 421, the radio memory receives UL data and signaling from memory circuitry 441. The DSP transfers corresponding UL signals to the analog/digital interface. The analog/digital interface converts the digital UL signals into analog UL signals for the modulators. The modulators up-convert the UL signals to their carrier frequencies. The amplifiers boost the UL signals for the filters which attenuate unwanted out-of-band energy. The filters transfer the UL signals through the duplexers to the antennas. The electrical UL signals drive the antennas to emit corresponding wireless UL signals to the wireless relays.

The PHY performs tasks like packet formation/deformation, windowing/de-windowing, guard-insertion/guard-deletion, and FFTs/IFFTs, data mapping/de-mapping, interleaving/de-interleaving, parsing/de-parsing, FEC encoding/decoding, control insertion/removal, RE mapping/de-mapping, precoding, layer mapping/de-mapping, modulation mapping/de-mapping, channel estimation, channel equalization, and IDFT, scrambling/descrambling, FEC encoding/decoding, parsing/de-parsing, interleaving/de-interleaving, data mapping/de-mapping, channel coding/decoding, rate matching/de-matching, modulation mapping/de-mapping, layer mapping/de-mapping, IDFT, channel estimation, channel equalization, precoding, and RE mapping/de-mapping.

The MAC maps between the MAC transport channels and MAC logical channels. MAC functions include buffer status, power headroom, channel quality, HARQ, user identification, random access, scheduling, and QoS. The RLC maps between the MAC logical channels and PDUs. RLC functions comprise ARQ, sequence numbering and resequencing, segmentation and resegmentation. The RLCs exchange data and signaling with the PDCP. The PDCP maps between the PDUs from the RLCs and SDUs for the RRCs/SDAPs. PDCP functions comprise security ciphering, header compression and decompression, sequence numbering and re-sequencing, and de-duplication. The PDCP exchanges SDUs with the RRC.

The RRC handles security and key management, handover operations, status reporting, and QoS. The RRC consumes the broadcast of system information. The RRC processes pages for wireless user device 401. The RRC interacts with the access RRC in the wireless relays to establish and terminate data sessions. The RRC exchanges N1 and Non-Access Stratum (NAS) signaling with the AMFs/MMEs. The RRC exchanges user data SDUs with the PDCP and exchanges the user data with the wireless relays. The SDAP exchanges SDUs with the PDCP. The SDAP exchanges S3 data with the access SDAP in the wireless relays. The SDAP maps between the SDUs and the QoS flows and mark the S3 data with the proper QoS.

In response to the user application, the content application generates user requests for data content that indicate content ID, user ID, user content priority, user geographic data, and content popularity. The content application encrypts the user requests and decrypts the data content. The content application stores the data content in memory circuitry 441 for consumption by the user application. For media content, the user application and operating system invoke the GPU in processing circuitry 451. The GPU drives the display and audio in user interface circuitry 411 to present the media content to the user.

Figure 5:
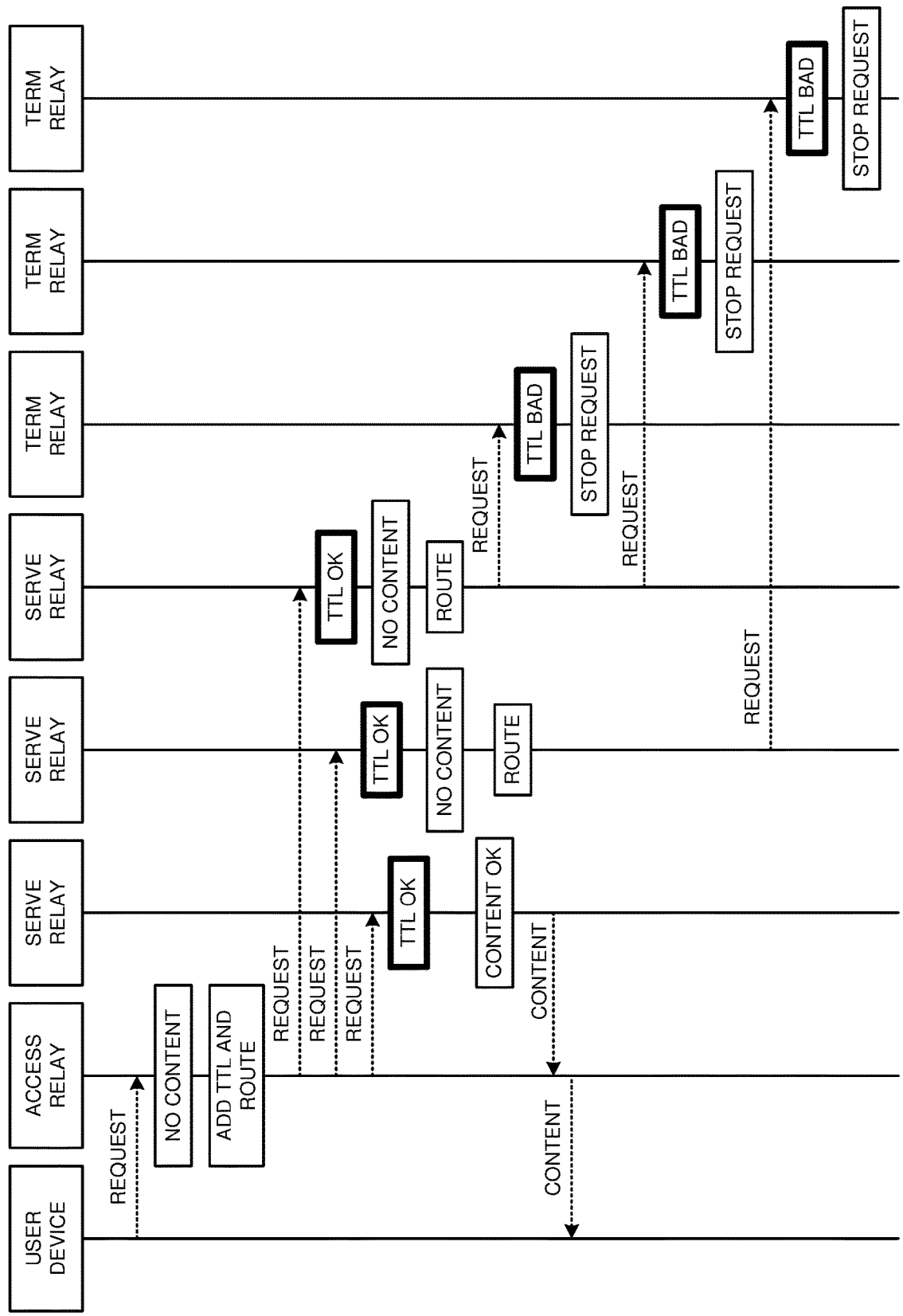
FIG. 5 illustrates wireless network operations to serve data content from wireless relays to wireless user devices.

FIG. 5 illustrates wireless network operations to serve data content from wireless relays to wireless user devices. A user device generates and transfers a user request for data content to the access wireless relay. The user request includes a content ID, user priority, content popularity, and mobility information. The access wireless relay determines if it stores the requested data content—the access relay does not store the data content in this example. When the access wireless relay does not store the requested data content, the access wireless relay transfers content requests to serving wireless relays based on routing data and/or content information. The content requests have a Time-To-Live (TTL) along with the content ID, user priority, content popularity, and user mobility information.

The serving wireless relays receive the content requests and determine if the TTL has expired—and the TTL is still OK in this example. Since the TTL has not expired, the serving wireless relays determine if they store the requested data content. The serving relay that stores the requested data content transfers the data content to the access wireless relay. The access wireless relay wirelessly transfers the requested data content to the wireless user device. If needed, the access wireless relay transfers termination messages for the requested data content to any other serving wireless relays that then terminate their data content service.

The serving relays that do not store the requested data content transfer content requests to additional wireless relays based on routing data and/or content information. The content requests have the TTL along with the content ID, user priority, content popularity, and mobility information. The terminating wireless relays receive the content requests and determine if the TTL has expired—and the TTL is now bad. Since the TTL has expired, the terminating wireless relays do not forward the content requests. The terminating wireless relays do not serve the requested data content.

The wireless data network circuitry described above comprises computer hardware and software that form a special-purpose machine—wireless relay circuitry that serves data content to wireless user devices. The computer hardware comprises processing circuitry like CPUs, DSPs, Graphical Processing Units (GPUs), transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose wireless relay circuitry that serves data content to wireless user devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to serve data content to a wireless user device, the method comprising:

an access wireless relay wirelessly receiving a user request from the wireless user device and transferring a content request having a Time-To-Live (TTL) and user mobility information when the access wireless relay does not store the data content;

a serving wireless relay receiving the content request during the TTL and transferring the data content to the access wireless relay when the serving wireless relay stores the data content and forwarding the content request having the TTL and the user mobility information when the serving wireless relay does not store the data content;

the serving wireless relay wirelessly receiving the data content and transferring the data content to the access wireless relay responsive to forwarding the content request;

the serving wireless relay storing the received data content responsive to the user mobility information; and the access wireless relay wirelessly transferring the data content to the wireless user device.

2. The method of claim 1 wherein the access wireless relay transferring the content request comprises the access wireless relay transferring the content request to the serving wireless relay and to additional serving wireless relays based on routing data that controls propagation of the content request.

3. The method of claim 1 wherein the serving wireless relay forwarding the content request comprises the serving wireless relay forwarding the content request to additional serving wireless relays based on routing data that controls propagation of the content request.

4. The method of claim 1 further comprising:
the access wireless relay transferring a user popularity indicator for the data content in the content request; and
the access wireless relay storing the data content from the serving wireless relay responsive to the user popularity indicator for the data content.

5. The method of claim 1 further comprising:
the access wireless relay transferring a user priority for the data content in the content request; and
the serving wireless relay forwarding the user priority in the content request.

6. The method of claim 1 further comprising:
the access wireless relay decrypting the user request and encrypting the content request; and
the serving wireless relay decrypting the content request and encrypting the content request.

7. The method of claim 1 wherein the user mobility information comprises a geographic vector.

8. The method of claim 1 wherein the user mobility information comprises earth coordinates.

9. The method of claim 1 wherein the user mobility information comprises a radio sector.

10. The method of claim 1 wherein the data content comprises video.

11. A wireless communication network to serve data content to a wireless user device, the wireless communication network comprising:
an access wireless relay configured to wirelessly receive a user request from the wireless user device, transfer a content request having a Time-To-Live (TTL) and user mobility information when the access wireless relay does not store the data content, and wirelessly transfer the data content to the wireless user device;
a serving wireless relay configured to receive the content request during the TTL and transfer the data content to the access wireless relay when the serving wireless relay stores the data content and forward the content request having the TTL and the user mobility information when the serving wireless relay does not store the data content;
the serving wireless relay configured to wirelessly receive the data content and wirelessly transfer the data content to the access wireless relay responsive to forwarding the content request; and
the serving wireless relay configured to store the received data content responsive to the user mobility information.

12. The wireless communication network of claim 11 further comprising the access wireless relay configured to transfer the content request to the serving wireless relay and to additional serving wireless relays based on routing data that controls propagation of the content request.

13. The wireless communication network of claim 11 further comprising the serving wireless relay configured to forward the content request to additional serving wireless relays based on routing data that controls propagation of the content request.

14. The wireless communication network of claim 11 further comprising:
the access wireless relay configured to transfer a user popularity indicator for the data content in the content request; and
the access wireless relay configured to store the data content from the serving wireless relay responsive to the user popularity indicator for the data content.

15. The wireless communication network of claim 11 further comprising:
the access wireless relay configured to transfer a user priority for the data content in the content request; and
the serving wireless relay configured to forward the user priority in the content request.

16. The wireless communication network of claim 11 further comprising:
the access wireless relay configured to decrypt the user request and encrypt the content request; and
the serving wireless relay configured to decrypt the content request and encrypt the content request.

17. The wireless communication network of claim 11 wherein the user mobility information comprises a geographic vector.

18. The wireless communication network of claim 11 wherein the user mobility information comprises earth coordinates.

19. The wireless communication network of claim 11 wherein the user mobility information comprises a radio sector.

20. The wireless communication network of claim 11 wherein the data content comprises video.

* * * * *